No. 882,897. PATENTED MAR. 24, 1908.
H. F. LARAVA.
INDICATOR.
APPLICATION FILED AUG. 29, 1907.
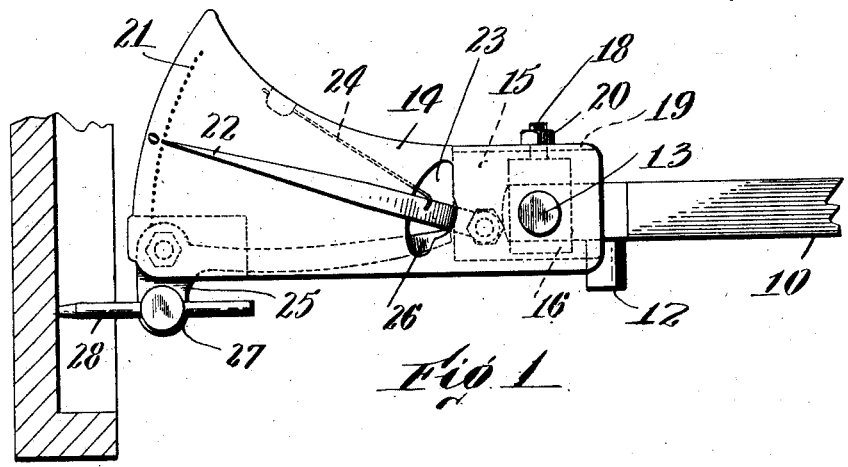
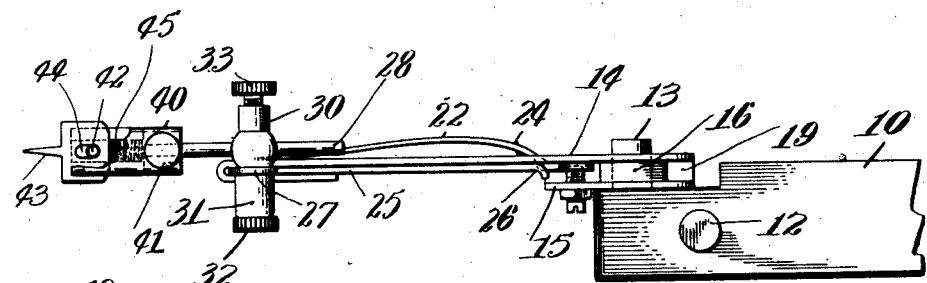
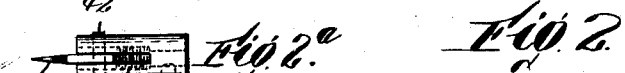
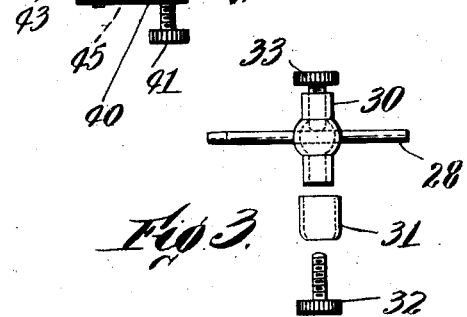
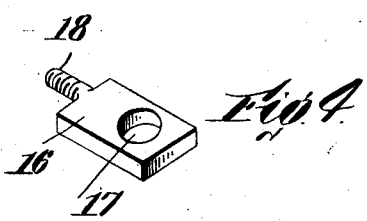
Witnesses:
Inventor:
H. F. Larava
by Attorneys
Southgate & Southgate

UNITED STATES PATENT OFFICE.

HENRY F. LARAVA, OF WORCESTER, MASSACHUSETTS.

INDICATOR.

No. 882,897.

Specification of Letters Patent.

Patented March 24, 1908.

Application filed August 29, 1907. Serial No. 390,604.

*To all whom it may concern:*

Be it known that I, HENRY F. LARAVA, a citizen of the United States, residing at Worcester, in the county of Worcester and State of Massachusetts, have invented a new and useful Indicator, of which the following is a specification.

This invention relates to an indicator adapted for all of the uses for which indicators are ordinarily employed, such as detecting any unevenness in a plain or curved surface, registering the amount of the inequality by means of a multiplying or micrometer device, gaging the work set up in lathes, planers, drill-presses, milling machines, shapers, and other machine tools, testing lathe centers or work held thereby, and the like, and centering prick-punched pieces.

The principal objects of the invention are to provide an implement of this character with a contact member which may be adjustable longitudinally and axially, to mount said contact member in such a way as to transmit motion to an indicating pointer in an accurate and sure manner, multiplying the same to a high degree; and to provide for mounting the contact member on a lever or bell-crank which, with the pointer, is mounted on a plate carrying a scale, said plate being capable of location on a bar which can be set up in a tool-post or the like in a plurality of positions, and said plate being adjustable about either a horizontal or vertical axis on said bar, thus securing additional adjustment and utility in the device.

Further objects of the invention are to simplify the construction by doing away with the gears and other expensive connections which are often employed in instruments of this character, and generally to improve the construction and operation of implements of this character, also to provide simple and efficient means for centering prick-punched pieces of metal.

Reference is to be had to the accompanying drawings which illustrate the preferred form of the invention, and in which Figure 1 is a plan of such an embodiment of the invention. Fig. 2 is a side elevation of the same. Fig. 2ª is a side view of an attachment constituting part of this invention. Fig. 3 is a detail view of the mechanism for fastening the contact member, and Fig. 4 is a perspective view of the detail.

The invention is shown as being provided with a support in the form of a bar 10 adapted to be set up in a tool-post or any other convenient supporting and clamping device on any kind of a machine-tool or the like. This bar is provided with a plurality of studs 12 and 13 which, in the present form are respectively horizontal and vertical. On either one of these studs is intended to be supported a plate 14 which constitutes the frame of the indicator. The plate may be supported in any convenient manner on any one of the studs, but is preferably formed of a piece of sheet steel bent over upon itself at the rear to form a base 15 spaced from the main body of the plate, the base and plate being perforated to allow the passage of one of the studs therethrough. In the space between the base and plate is located a block 16 which is provided with a perforation 17 for the studs, and which has a screw-threaded projection 18 extending through the web 19 which connects the base 15 with the plate 14. A nut 20 is screwed on the projection 18 to clamp the frame or plate 14 to either one of the studs with which the bar 10 is provided. It will be seen that in this way the plate 14 may be mounted either horizontally or vertically, and that it may be swung to any desired angle and then clamped securely in position.

The plate 14 is provided with a scale 21 near the outer end thereof, and on it is pivotally mounted a pointer 22, the pivot thereof preferably being parallel with the axis of the perforations for receiving the studs on the bar.

In the present form the pointer extends through an opening 23 in the plate. A spring 24 is employed to move the pointer in one direction along the scale, and a bell-crank 25 for moving it in the other. This bell-crank has a long arm 26 for engaging the pointer near its pivotal point of support so that an extensive multiplying action may be secured. This bell-crank is pivoted on a plate and has a short arm 27 from which it receives motion. On account of the difference in the lengths of the two arms of the bell-crank, a multiplying effect is secured thereby.

The short arm of the bell-crank is designed to support the contact piece 28 in such a manner that the latter may be adjusted longitudinally and axially on the bell-crank and clamped in adjusted positions in a simple and convenient manner. For this purpose the short arm is provided with a perforation through which passes the bottom of a holder 30.

Below the bell-crank is a collar 31, and a headed screw 32 passes through the collar into a screw-threaded opening in the bottom of the holder 30 so that the holder can be turned in the perforation in which it sets and can be clamped in any angular position by the screw.

The contact member 28 passes through a passage through the holder and is adjustable longitudinally therein, being held in position by a clamping screw 33 as will be readily understood.

An important use of the device is to center pieces of iron which are prick-punched in the end. This is preferably accomplished by an attachment which has a center point yielding transversely with respect to the scale 21, but rigid the other way, so that when the center is put in the prick-punch, the rotation of the latter when out of center will move the pointer, but will not tend to move the contact piece 28 in a direction at right angles thereto. This is shown in Figs. 2 and 2ª. On the contact piece 28 is mounted a head 40, fixed to the piece 28 in adjusted position by a set-screw 41 or the like. This head has a cross-pin 42 on which is pivotally mounted a center point 43, the latter having a slot 44 through which the cross-pin passes, so that it may have a motion back and forth. A spring 45 bears on the rear surface of the center point to normally hold it out and in central position. The spring is located in a cavity in the head. In operation the center point is inserted in the prick-punch and the work rotated. If the prick-punch is out of center the horizontal motion will move the pointer 22, while the vertical motion will idly oscillate the center point on the cross-pin 42. When the work is centered both of these motions will cease at once.

It will be seen that this construction is very simple and inexpensive; that it provides for a great multiplication of the movement of the contact member through two means, namely, the difference in lengths of the arms of the bell-crank and the point at which the long arm engages the pointer. Moreover, the contact member is adjustable in two ways on the bell-crank, and the plate or frame supporting the whole device is also adapted to be mounted in a plurality of ways and to be adjusted when so mounted.

While I have illustrated and described a preferred form of the invention I am aware that many modifications may be made therein by any person skilled in the art without departing from the scope thereof as expressed in the claims. Therefore, I do not wish to be limited to the particular form shown, but What I do claim is:—

1. In an indicator, the combination of the moving pointer, a lever for operating the pointer, and a contact member mounted on said lever and adjustable longitudinally and axially thereon.

2. In an indicator, the combination of the moving pointer, a lever for operating the pointer, a contact member connected with said lever and adjustable longitudinally and axially with respect thereto, means for clamping said contact member against longitudinal movement, and means for clamping it against axial movement.

3. In an indicator, the combination of the moving pointer, a lever for operating said moving pointer, a lever for operating said pointer having an arm provided with a perforation, a holder entering said perforation and adapted to turn about the center thereof, a fastening device on the underside of said arm for clamping the holder to the arm and preventing said axial movement, a contact member consisting of a rod passing through said holding member and longitudinally movable with respect thereto, and means on the holding member for clamping the contact member against longitudinal movement.

4. In an indicator, the combination of the moving pointer, a bell-crank having a long arm and a short arm, the long arm of the bell-crank engaging the pointer for moving it, a holder mounted on the short arm of the bell-crank and axially adjustable thereon, means for clamping the holder in adjusted positions, and a contact member supported by said holder.

5. In an indicator, the combination of a plate having a scale, a pointer pivotally mounted on said plate, a spring for moving the pointer in one direction, a bell-crank pivotally mounted on the plate and having an arm for engaging the pointer near its pivotal point of support to move the same over the scale, said bell-crank having a short arm, and a contact member adjustably mounted on said short arm.

6. In an indicator, the combination of a plate, means for supporting said plate, said plate being mounted to swing about an axis perpendicular to the plane thereof, means for clamping said plate against axial motion, said plate having a scale, a pointer pivotally mounted on said plate to move over the scale, a bell-crank pivoted on said plate having a long arm engaging the pointer to move it, and a short arm, and a contact member mounted on the short arm.

7. In an indicator, the combination of a bar adapted to be held by a tool-post or the like having a vertical stud and a horizontal stud, with an indicator-plate adapted to be mounted on either of said studs, whereby said plate may be placed in a vertical position or horizontal position, said plate being adapted to swing about the stud on which it is mounted, means for clamping the plate against swinging motion, said plate having a scale, a pointer on the plate, a lever supported by the plate for moving the pointer, and a contact member supported by the lever.

8. In an indicator, the combination of a plate having a scale, a pointer pivotally mounted on said plate, a spring for moving the pointer in one direction, a bell-crank pivotally mounted on the plate and having an arm for engaging the pointer near its pivotal point of support to move the same over the scale, said bell-crank having a short arm, a contact member adjustably mounted on said short arm, and a center point removably mounted on the contact member.

9. In an indicator, the combination of the moving pointer, a lever for operating the pointer, a contact member movable with said lever and adjustable longitudinally and axially, means for clamping said contact member against longitudinal movement, means for clamping it against axial movement with respect to the lever, and a center point removably mounted on the contact member.

10. In an indicator of the character described, the combination of a moving pointer, a lever for operating the pointer, a contact member adjustably connected with said lever, and a center point removably mounted on the contact member.

11. In an indicator, the combination of a movable pointer, a lever for operating the pointer, a head supported from the lever, and a center point movably mounted on the head.

12. In an indicator, the combination of a movable pointer, a movable head, means for transmitting motion from the head to the pointer, and a center point mounted on the head and capable of an oscillating motion at right angles to the direction of motion of the head.

13. In an indicator, the combination of a movable pointer, a movable head, means for transmitting motion from the head to the pointer, and a center point mounted on the head and capable of an oscillating motion at right angles to the direction of motion of the head, said center point being incapable of motion in the direction in which the head moves, independently of the head.

14. In an indicator, the combination of a movable pointer, a lever for operating the pointer, a head supported from the lever, a center point movably mounted on the head, said head having a cross-pin, and the center point a longitudinal slot through which the cross-pin passes, and on which the center point is pivoted, and a spring in the head bearing on the rear of the center point.

In testimony whereof I have hereunto set my hand, in the presence of two suscribing witnesses.

HENRY F. LARAVA.

Witnesses:
J. J. McCann,
M. D. Love.